March 1, 1949.  E. M. SORENSEN  2,462,913
ELECTRICAL CONTROL
Filed Aug. 18, 1943  4 Sheets-Sheet 1
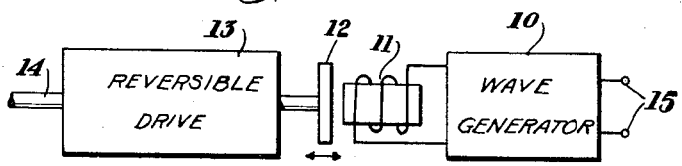
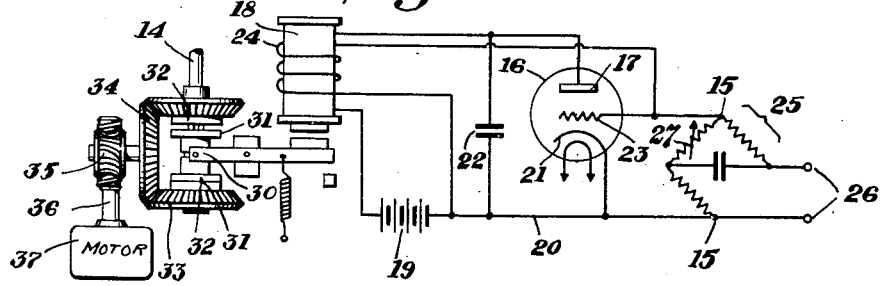
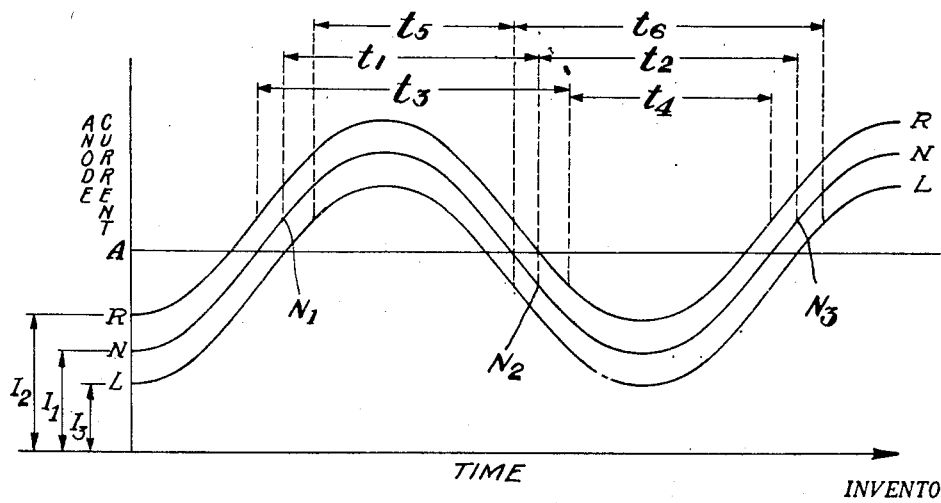
INVENTOR.
EDWARD M. SORENSEN
BY Geo. G. Hyde
ATTORNEY March 1, 1949.  E. M. SORENSEN  2,462,913
ELECTRICAL CONTROL Filed Aug. 18, 1943

INVENTOR.
EDWARD M. SORENSEN
BY Geo. G. Hyde
ATTORNEY

March 1, 1949.  E. M. SORENSEN  2,462,913
ELECTRICAL CONTROL

Filed Aug. 18, 1943  4 Sheets-Sheet 3

INVENTOR.
EDWARD M. SORENSEN
BY Geo. L. Hyde
ATTORNEY

March 1, 1949. E. M. SORENSEN 2,462,913
ELECTRICAL CONTROL
Filed Aug. 18, 1943 4 Sheets-Sheet 4
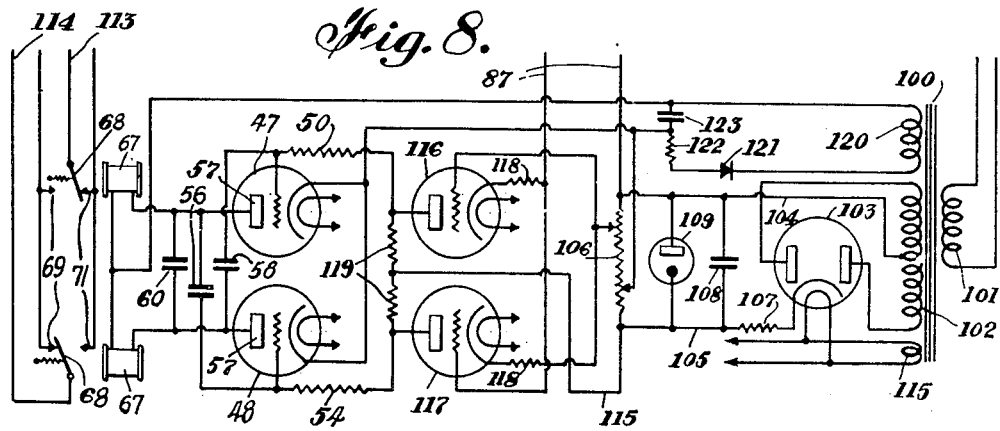
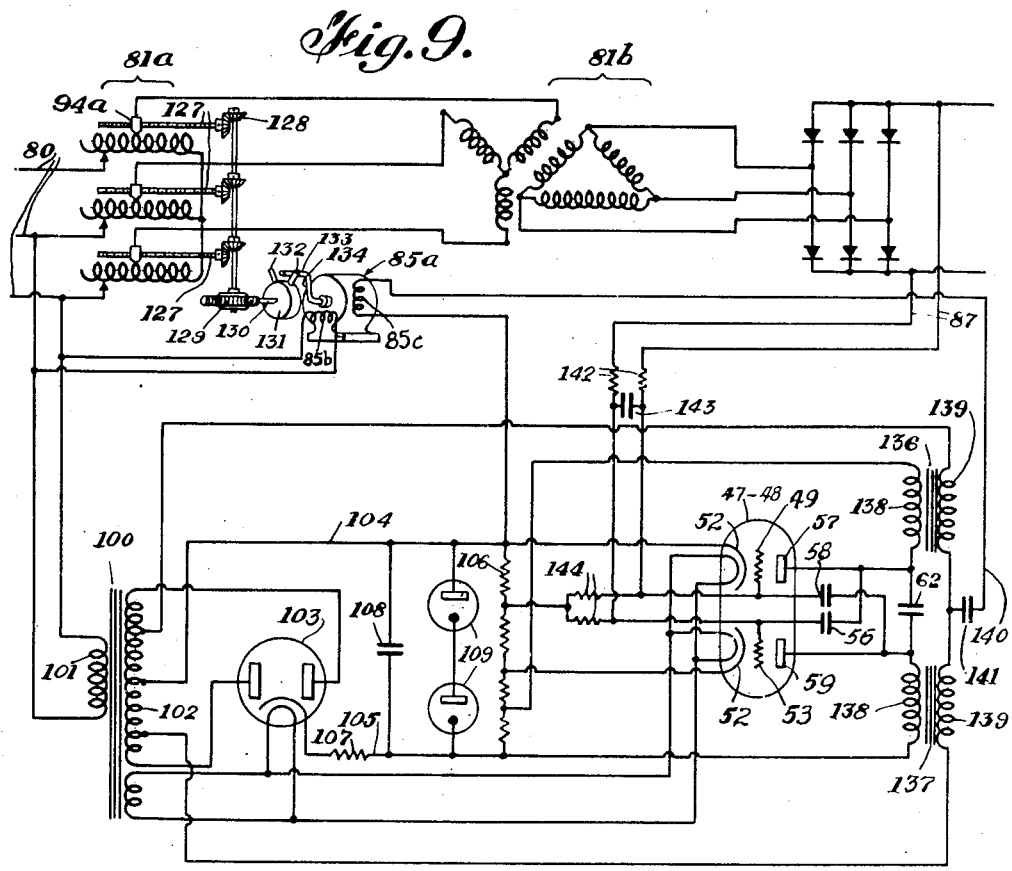
INVENTOR.
EDWARD M. SORENSEN
BY Geo. G. Hyde
ATTORNEY Patented Mar. 1, 1949

2,462,913

UNITED STATES PATENT OFFICE 2,462,913

ELECTRICAL CONTROL

Edward M. Sorensen, Stamford, Conn.

Application August 18, 1943, Serial No. 499,034

8 Claims. (Cl. 323—18)

This invention relates to improvements in electrical control apparatus and especially to apparatus responsive to variations of a control potential from a predetermined value, said apparatus being adapted to make mechanical or electrical adjustments which correspond to such variations. It is suitable for use in voltage regulating systems.

A feature of the invention is the provision of an electrical control system which includes a fixed potential used as a basis of comparison for the control potential, the system being responsive to differences between said potentials. This arrangement is especially sensitive, responding to slight swings of the control potential from said predetermined normal value.

A purpose of the invention is to provide an arrangement that is prompt and positive in action. This is in general accomplished by providing an electrical circuit arranged to operate a reversible control device alternately in opposite directions during brief periods. The system is arranged for balanced operation when a predetermined control potential is applied, resulting in uniform oscillation in the output circuit. Under these conditions the control device is energized for equal periods in each direction, with no resultant net motion of the device. However, when the control potential shifts from the predetermined value, each period of energizing of the device in one direction differs in duration from each period of energizing in the opposite direction, producing a net resultant motion of the control device in the desired direction, which corresponds to the direction of potential swing.

The system is especially suitable for controlling electrically actuated reversible drives, such as a reversible motor, a reversible magnetic clutch associated with a constantly rotating drive shaft, or a reversing drive actuated in one direction by a spring and in the other direction by electrical means controlled in accordance with the invention. With an arrangement of this type, rapidly alternating uniform mechanical impulses in opposite directions are provided and are available at all times for making the required mechanical adjustment, thereby eliminating variable factors and uneven operation which are encountered in systems which start the motor or other driving device only when an adjustment is required. This feature assures the application of full and uniform force to the regulating device regardless of the extent of the potential deviation or of the necessary correction, a substantial improvement over other systems in which the power available for correction decreases materially when the unbalance is of small magnitude.

A specific purpose of the invention is to provide a voltage regulating system which will utilize the indicated type of control. It is particularly applicable to installations where it is impossible or undesirable to regulate the voltage at the generator or other power source. Systems embodying the invention are adapted to compensate automatically for changes introduced by adjustments of the transformer in a rectification system, and particularly the resulting variations in resistances. Such systems are also adapted to handle the entire load through a transformer and rectifier system. An important purpose of this invention is the provision of a voltage regulator that will provide uniform regulation regardless of variations in the input voltage or the load throughout its entire range, and in particular one that will be effective under conditions where there is no load.

The invention also includes an improved arrangement for utilizing a two phase motor which is reversed by a novel system of alternately actuated relays.

The invention is of particular value for use in aircraft electrical systems, in which many of the above features are especially advantageous. More specifically, the invention makes it possible to produce efficient voltage regulators that will handle relatively high power although they are substantially lighter and smaller than other forms suitable for similar operating conditions. Moreover, it is particularly important in such installations that the voltage of the direct current supply which is obtained from a rectifier connected to a source of alternating current should be kept at a highly uniform value regardless of the inevitable variations in the power from such source and in the load.

An advantage of systems embodying the invention is the facility with which they may be employed in providing parallel balanced direct current output from a plurality of generators, a function that is especially important in aircraft installations.

Further purposes and advantages will appear from the following description considered in connection with the accompanying drawings, in which Fig. 1 is a block diagram illustrating a simplified embodiment of the invention;

Fig. 2 is a diagrammatic showing of one arrangement of the type indicated in Fig. 1;

Fig. 3 is a wave diagram illustrating the principle of operation;

Fig. 8 is a variation of the control circuits of Fig. 7 utilizing a stage of amplification; and Fig. 9 is a diagram of another form of voltage regulating systems employing saturable core reactors.

Figure 4:
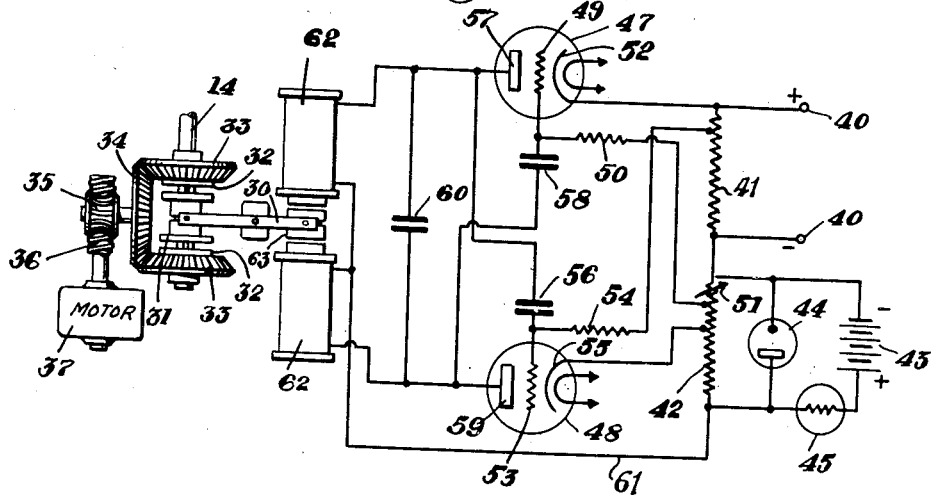
Fig. 4 is a diagram of a system utilizing two tubes controlling a reversible clutch drive.

In general the invention includes the provision of a wave generating system and an actuating device such as one or more magnetic clutches or relays adapted to be operated alternately in opposite directions by the waves from the circuit, the actuating device being connected so as to operate a regulator alternately in opposite directions. This arrangement may be utilized either mechanically, using an oscillating or reciprocating regulating member, or electrically, as by alternately energizing two circuits having opposite effects on a regulating device such as a reversible motor. The generating system is arranged so that a change in control potential, ordinarily applied to a grid of the tube, will vary the relative duration of the alternate actions of said actuating device. This will of course result in a corresponding unbalance in duration of alternate actions of the regulating device, producing a differential action whose net resultant or direction is dependent upon the direction of change of potential.

The general arrangement is indicated diagrammatically in Fig. 1, in which wave generator 10 produces waves which alternately energize and deenergize electromagnet 11, causing the armature 12 to oscillate and actuate the reversible drive 13 alternately in opposite directions so that the operating shaft 14 driven by drive 13 is free from net rotation in the absence of a deviation of the control potential from normal. This potential is applied across input terminals 15 of the wave generator and is arranged so that the magnet 11 will operate symmetrically when said potential has a normal value. Any change in said potential, however, will produce differential net rotation of the drive shaft 14 in the corresponding direction.

A simplified arrangement employing a control system provided with a single wave-generating tube operating a single relay is diagrammatically illustrated in Fig. 2. The tube 16 is incorporated in a suitable wave generating circuit, the form illustrated being a simple tickler feedback oscillator in which the anode 17 is connected through the winding of relay 18 and B battery 19 to lead 20 extending to cathode 21. Capacitor 22 is shunted across the relay and battery, and grid 23 is connected through tickler coil 24 to lead 20.

The control potential is applied across terminals 15 connected respectively to grid 23 and lead 20. It is ordinarily desirable to provide an arrangement for applying across these terminals a potential that will produce the desired type of tube operation even though the actual control potential may have a substantially different value. Various arrangements for adjusting the control potential to the desired value for tube operation may be used, the one illustrated including a bridge arrangement 25 with the control potential applied across terminals 26 forming one leg of the bridge. By varying the resistance and consequent drop in potential across opposite leg 27 the desired potential across terminals 15 may be obtained.

Relay 18 is alternately energized and deenergized by the waves generated by tube 16, thereby oscillating loaded armature 30. The latter may be utilized either to produce mechanical movement in opposite directions or to close alternately two circuits which produce reverse action such as the reversing circuits of a motor. In the form illustrated a reversible clutch is diagrammatically shown, armature 30 being arranged to shift the double-ended clutch member 31 alternately into engagement with clutch faces 32 each mounted on a miter gear 33 meshing with a common miter drive gear 34 driven continuously in any desired fashion, as through worm gear 35 and worm 36 on the shaft of motor 37. Since clutch member 31 is keyed to regulator shaft 14 while gears 33 rotate freely thereon, shaft 14 will be alternatively driven in opposite directions, the duration of each drive period depending upon the duration of engagement of each member 31 with the corresponding face 32.

The principle of operation of this type of embodiment is illustrated in Fig. 3, which is a diagrammatic showing of the sinusoidal anode current from tube 16. When the system is operating in balanced condition with no differential movement of shaft 14 the anode current is represented by curve N having a minimum value of I1. Since the current required to close relay 18 is higher than that at which it will subsequently open, the circuit values are arranged so that the point N1 on curve N at which the relay will close, and the point N2 at which it opens, are symmetrically arranged with relation to the average current value represented by line A. Under these circumstances the time $t1$ between points N1 and N2 during which the relay is closed will be equal to the time $t2$ between points N2 and N3 during which it is open.

When the control potential applied to terminals 26 is increased, and since tube 16 is arranged to function as an amplifier on the straight portion of its grid potential anode current characteristic, the minimum value I2 of the anode current will be increased and the current curve R will be located at a corresponding distance above curve N. Under these circumstances the time $t3$ during which the relay is closed will be substantially greater than the time $t4$ during which it is open, resulting in a differential net rotation of shaft 14 in one direction. On the other hand, if the potential across terminals 26 drops below the predetermined value the minimum anode current value I3 will be correspondingly reduced, the current curve L will be located below curve N, and the time $t5$ during which the relay is closed will be substantially less than the time $t6$ during which it is open, producing a net rotation of shaft 14 in the opposite direction.

It will be apparent that by varying the position of the anode current curve and its relation to the current values at which the relay will close and open, a considerable variation in the differential action of the drive mechanism due to predetermined slight variations in the control potential may be obtained.

While the usual sinusoidal anode current curve has been illustrated, it will be apparent that the invention may likewise employ waves of different form, and particularly waves of the pulse type, with well-known tube and circuit arrangements suitable for producing appropriate current waves.

A preferred arrangement employing a duplex system illustrated in simplified form in Fig. 4 utilizes two vacuum tubes whose electrodes are interconnected to form a stable oscillating circuit, and includes two actuating devices each located in the anode circuit of a tube and arranged for alternate energization. The circuits are arranged so that an increase in control potential will cause one device to be energized for a longer period than the other, while a decrease in control potential below normal will cause said other device to be energized for the longer period.

The devices may be suitably connected to mechanical or electrical arrangements utilizing this differential action; and in the form illustrated in Fig. 4 the magnets of a reversible magnetic clutch are alternately energized so that the operating shaft 14 rotates first in one direction and then in the other, any difference between the duration of successive periods of uni-directional rotation resulting in a net rotation in one direction.

In this embodiment the control potential is applied across terminals 40 shunted by resistor 41. A stable comparison potential is obtained by applying a stable potential across resistor 42 connected in series with resistor 41. The latter potential may be provided by a battery 43; and suitable means may be included for assuring uniformity of said potential during operation, such as a voltage regulating gas filled tube 44 across the source of potential and a ballast lamp 45 in series with the source.

Potentials derived from resistors 41 and 42 are utilized to control the operation of two triodes 47 and 48 connected in a circuit of the well-known multi-vibrator type. Grid 49 of tube 47 is connected through resistor 50 to a point on resistor 42 appropriately spaced from the negative end to provide the proper grid potential, the end portion 51 of said resistor beyond the grid connection being advantageously variable to provide accurate adjustment. The cathode 52 is connected to the positive terminal 40. Grid 53 of tube 48 is connected through resistor 54 to an appropriate point on resistor 41, and cathode 55 to the proper point on resistor 42 for obtaining the necessary potential difference. The connections are such that, when the control potential across terminals 40 is normal, the same bias potentials will be applied to grids 49 and 53. Grid 53 is connected through capacitor 56 to the anode 57 of tube 47, while grid 49 is connected through capacitor 58 to anode 59 of tube 48. Capacitor 60 is shunted across the anodes, each of which is connected to an electrically operated actuating device and thence through return lead 61 to the positive end of resistor 42.

In the form shown in Fig. 4 the actuating devices comprise an electro-magnetic reversing clutch unit. Various types of such clutches are known, one form being diagrammatically shown by way of illustration. It includes two electromagnets 62, each connected in series between an anode and the return lead 61, arranged on opposite sides of a common armature 63 mounted on the end of rocker arm 30 connected to a reversible drive gear construction of the type shown in Fig. 2.

As has been indicated, the principle of operation of the circuit arrangement is the same as that of the well-known multi-vibrator circuit. The magnets 62 are alternately energized by the anode current pulses of the two tubes, the frequency of alternation being regulated by the characteristics of the condenser 60 and the magnets 62. This frequency may be made sufficiently low to provide a suitable period of actuation of the clutches, so that armature 63 will oscillate between opposite clutch-engaging positions in synchronism with the electrical oscillations generated by the multi-vibrator circuit.

If the control potential impressed across the terminals 40 is in balance with the standard of comparison potential across resistor 42 the two tubes will be in balance, the periods of anode current flow will be equal, and the alternate actuation of magnets 62 will have no net effect. If, however, the control voltage is increased, grid 53 will have an increased positive swing which will lengthen the duration of current flow from anode 59; whereas a decrease in the control potential across terminals 40 will similarly decrease the anode current flow in tube 48 in comparison with the duration of such flow when the circuit is in normally balanced operation. With proper design the circuits can be arranged so that the time of operation of either magnet 62 may be increased until the other circuit is not energized at all, providing a maximum rate of operation in either direction.

Figure 5:
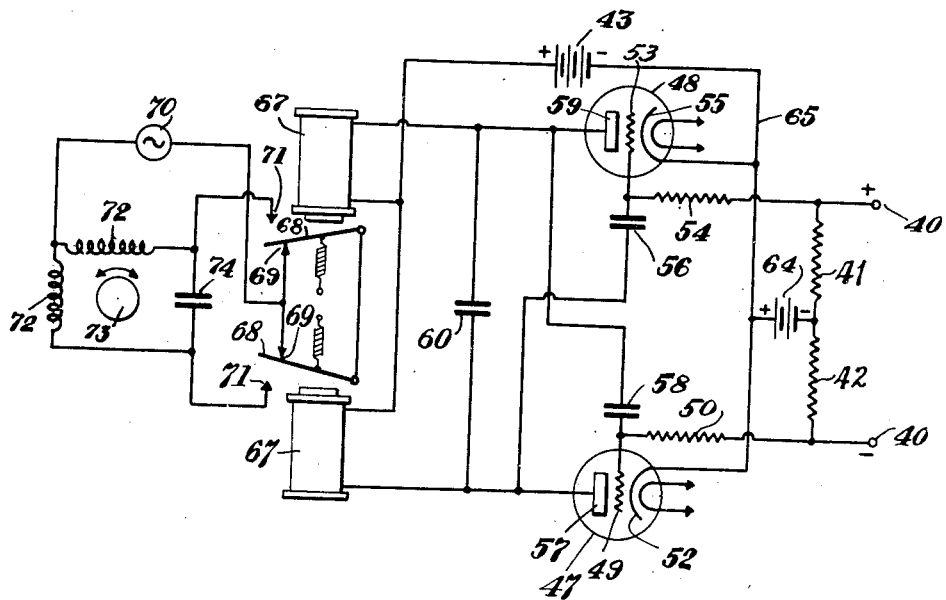
Fig. 5 is a diagram of a similar system controlling a reversible motor through relays.

The general circuit arrangement shown in Fig. 5 is similar to that of Fig. 4, and corresponding parts are similarly numbered. In this arrangement however a different and simplified arrangement for applying the control potential and the standard of comparison potential to the tubes is employed. The grids 49, 53 are connected to the ends of resistor 41, and the proper grid potential is obtained from a C battery 64 connected between the mid-point of the resistor 41 and the lead 65 connecting battery 43 to the cathodes.

Alternately energized relays 67 are substituted for the magnets 62, and the armatures 68 of the relays are electrically interconnected, being held by suitable springs in open position against contacts 69 connected to one side of a suitable source of power such as generator 70. The other armature contacts 71 are connected to the direction-controlling field windings 72 of reversible motor 73, shunted by capacitor 74, the opposite end of each of said windings being connected to the generator 70. With this arrangement the alternate energizing of relays 67 will alternately energize the field windings 72 and will operate motor 73 alternately in opposite directions, the period of operation in each direction corresponding to the duration of current flow from the energizing anode 57 or 59.

It will be noted that with the disclosed arrangement of the armatures there is no danger of continuously connecting motor 73 across generator 70; for when both relays are either energized or deenergized simultaneously, no circuit through the generator and motor will be completed. The frequency of alternation can be adjusted to obtain effective relay operation, a frequency of ten cycles per second having been found satisfactory in one embodiment of the invention.

It will be evident that while the arrangement of Fig. 5 has been shown as operating a reversible motor, it is applicable to other arrangements in which a reversing or oscillating action may be produced by alternating current pulses.

Figure 6:
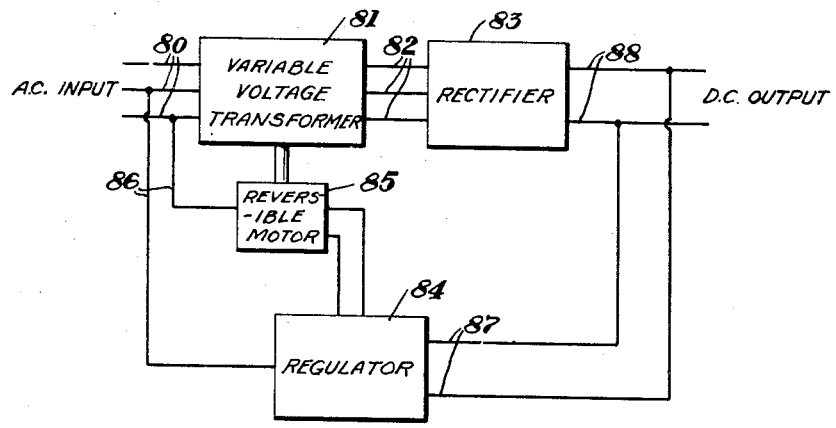
Fig. 6 is a block diagram illustrating the application of the invention to a voltage regulating system.

The application of the invention to a voltage control system is illustrated in Fig. 6, being shown in connection with a rectified three-phase alternating current supply. In systems of this type it is frequently necessary to handle a relatively heavy load; and prior voltage regulation systems applied to this type of installation have been excessively heavy and bulky, or required the use of special tubes with resultant complications. Moreover, the potential of the input energy may be subject to substantial variations. These conditions exist for example in airplane installations as already noted; and the invention is especially adapted to take care of them efficiently.

In the general arrangement of units indicated in Fig. 6 the three-phase alternating current input from lines 80 is passed through a variable voltage transformer 81 of the type provided with movable elements for adjusting the voltage of the output through leads 82 to rectifier 83. The voltage regulator 84 controls reversible motor 85 and is energized through leads 86 connected to two of the supply lines 80, being actuated by variations in voltage between leads 87 connected across D. C. output lines 88 from rectifier 83.

Figure 7:
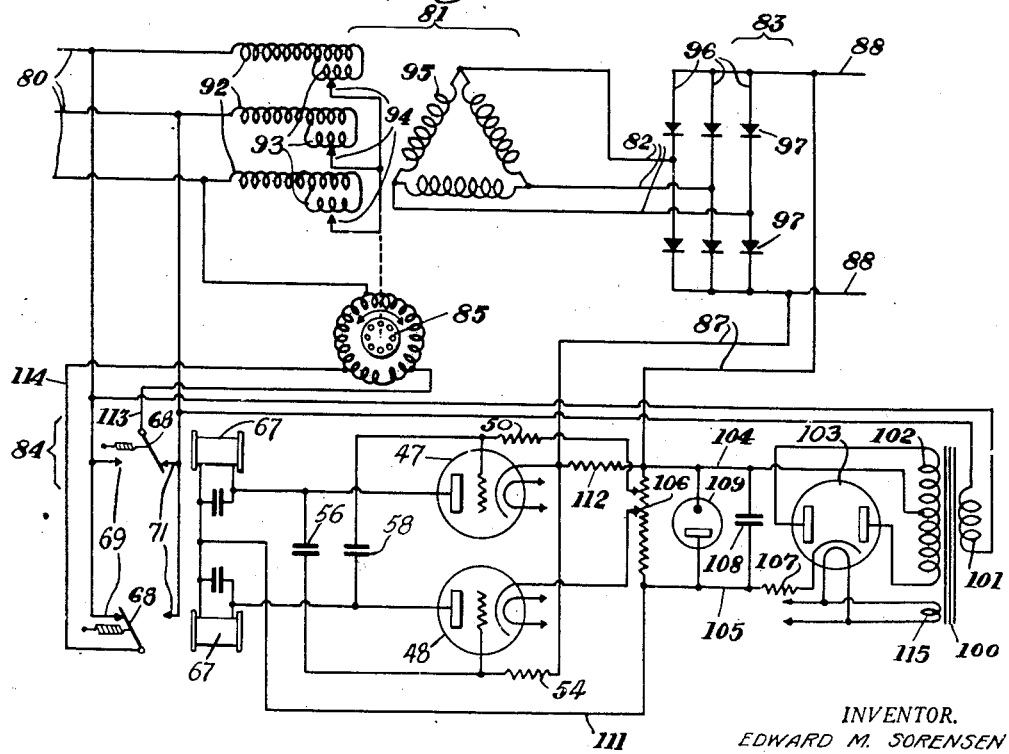
Fig. 7 is a diagram of a voltage regulating system illustrating one circuit arrangement.

The details of one arrangement suitable for use in the system shown in Fig. 6 is illustrated in Fig. 7. In this embodiment the three phase variable voltage transformer 81 has three primary windings 92 each including a bridge portion 93 engaged by a sliding contact 94, said contacts being connected to provide a Y-connected primary. Contacts 94 are mechanically as well as electrically connected, being shiftable together to vary the inductance of the primary and consequently the output voltage. The details of this arrangement are well known in the art and therefore are not described. The secondary winding 95 as shown is delta-connected, with its terminals connected through leads 82 to the three full wave rectifier circuits 96 each handling one phase and provided with rectifier units 97 at opposite sides of the junction with the connecting lead 82, said circuits being connected to the D. C. output leads 88 in the usual manner. The illustrated arrangement constitutes a three-phase full wave rectifier 83.

The regulator 83 is controlled by the potential across lines 88 to operate reversible motor 85 and shift contacts 94 appropriately to correct deviations in voltage between lines 88. In this embodiment power for the control is derived from a transformer 100 whose primary 101 is connected across two of the leads 80. The secondary 102 is connected at its ends to the anodes of a full wave rectifier tube 103, the rectified output being conducted by leads 104, connected to the midpoint of secondary 102, and 105, connected to the cathode of tube 103, to the ends of resistor 106. A suitable filter, indicated by resistor 107 and condenser 108, may be provided for smoothing the rectifier output; and a voltage regulating gas filled tube 109 is advantageously connected across said lines to assure uniformity of supply voltage.

The oscillating system is similar to that shown in Figs. 4 and 5, and corresponding parts bear the same numbers, though certain variations have been introduced in the circuits. The plate potential is derived from the power supply system through lead 111 connected to an end of resistor 106. The grid of tube 47 and the cathode of tube 48 are connected at appropriate points to resistor 106, while the grid of tube 48 and the cathode of tube 47 are connected to resistor 112 shunted across leads 87, the arrangement being such that the correct voltage is applied to the grids.

It will be noted that in this arrangement the resistors 106 and 112 are connected to each other at one end; and under normal conditions the voltage drop across resistor 112 will be equal to the voltage drop across the portion of resistor 106 between said end and the connection to the cathode of tube 48. Under the circumstances the potentials applied to the two grids from points of equal potential on resistors 106 and 112 under normal operation, will be equal and relays 67 will be alternately energized during equal periods. The relay contact points 69, 71 are connected to two of the leads 80 to provide a power supply, and the leads 113, 114 from the spring-loaded armatures 68 are suitably connected to the motor 85 for reversing operation. In this instance a three-phase delta-connected motor is illustrated with one terminal connected to the other A. C. input lead 80 while the remaining two terminals are connected to leads 113 and 114, so that the direction of rotation of the motor will be reversed by the reversal of the connections of the latter terminals by the alternate operation of relays 67.

With this arrangement a change in the potential between output leads 88 will produce a corresponding change in the potential drop across resistor 112, altering the grid potentials of tubes 47, 48 and changing the relative periods of operation of the relays 67, in the manner already explained.

In the form shown in Fig. 7 a secondary winding 115 for supplying a filament heating current is provided, the illustrated arrangement constituting a self-contained unit adaptable for use on airplanes. It will be understood however, that this is by way of illustration, for other arrangements for supplying power and uniform stable potential for purposes of comparison with the D. C. output potential may be used where circumstances permit.

The embodiment illustrated in Fig. 7 is sensitive, and will maintain uniform potential across lines 88 even with considerable variation in input potential on lines 80 and wide variations in the load across the D. C. output. However, if additional sensitivity is required amplification may be employed as illustrated in Fig. 8. In this arrangement the leads 87 are connected respectively to one end of resistor 106 and to the cathode of amplifier tube 116 as well as to the grid of the other amplifier tube 117. The grid of tube 116 and the cathode of tube 117 are connected to an appropriate point on resistor 106 so that the voltage drop between said point and the lead 87 connected to said resistor is equal under normal conditions to the voltage difference between said leads 87. Suitable resistors 118 in the cathode circuits of the amplifier tubes may be employed to provide the desirable potential difference between each cathode and the connected grid of the other tube.

The anodes of tubes 116, 117 are connected to the anode potential lead 115 through resistors 119, and to the grids of the oscillator circuit tubes 47, 48 through resistors 50 and 54 respectively. The circuits connected to and operated by the latter tubes are the same as those shown in Fig. 5, except that the anode potential is obtained from a special secondary winding 120 through a circuit connected to the cathodes of tubes 47, 48 the circuit including a rectifier 121 and preferably a filter illustrated by a resistor 122 and condenser 123. This arrangement likewise is self-contained and suitable for construction as a unit.

Certain modifications, alternative arrangements and auxiliary features are illustrated in the embodiment shown in Fig. 9. One involves the main line transformer arrangement. Two transformers are utilized, the first transformer 81a being of the auto-transformer type with sliding contacts 94a operated by threaded shafts 127 driven through bevel pinions 128, worm gear 129 and worm 130 from motor 85a.

An arrangement for avoiding unnecessary movement of the control shaft is also shown. The extent to which the shaft of the motor or other driving device actuated by the relay armature circuits will oscillate under normal balanced conditions depends upon a number of design factors; but in most instances it may be represented by oscillation through a determinable arc. It is therefore desirable to provide sufficient lost motion between the rotor and the contacts 94 or 94a so that normal balanced oscillation of the rotor will not result in any movement of the contacts, although unbalanced oscillation will cause such movement.

Various types of lost motion devices may be employed. In the form illustrated diagrammatically in Fig. 9 the drive worm 130 carries a disk 131 provided with spaced pins 132 between which extends the offset end of an arm 133 attached to shaft 134 of motor 85a. The arrangement is such that during normal oscillation of shaft 134 the arm 133 will oscillate between pins 132 without moving worm 130; but when the oscillations of shaft 134 are greater in one direction than in the other, disk 131 and worm 130 will be turned by a corresponding amount during each swing of arm 133 in the former direction.

Other modifications are also disclosed. The motor 85a has a winding 85b connected across two of the A. C. input leads 80, and winding 85c through which the current is reversed to reverse the direction of motor rotation. The relay arrangement is replaced by saturable core transformers 136, 137 whose primaries 138 are connected in place of the relay windings, their secondaries 139 being connected in series across a portion of the main transformer secondary 102 providing appropriate potential for motor operation. A lead 140 provided with a phase reversing condenser 141 extends from the junction between the secondaries 139 to motor winding 85c, the other end of which is returned to an end of resistor 106. With this arrangement the alternate energization of transformers 136 and 137 will alternately saturate the cores, substantially eliminating change of flux through the secondary of each transformer when its core is saturated and permitting the motor-operating current to flow from main transformer secondary 102 through the secondary of the other transformer 136 or 137 and lead 140 to the motor. When one of the latter transformers is energized for longer periods than the other the differential effect on the motor will be the same as that heretofore described in connection with systems employing relays. This arrangement likewise illustrates the use of isolating resistors 142 in leads 87, and a bypass condenser 143 across said leads for shorting stray oscillations. It should be noted that the grids are connected to each other through equal resistors 144 and thence to a point of suitable potential on resistor 106. This arrangement, however, is not as sensitive as those previously described, since only half of any voltage change between leads 87 is impressed on each grid. Other minor variations are the use of a double triode tube 47—48, and the use of two voltage regulator tubes 109 in series.

What is claimed is:

1. Electrical control apparatus comprising a reversible controlling device, electrical operating means for alternately and continuously moving the device in opposite directions over a given period comprising an oscillating electrical circuit, an electrically actuated operating device associated with the circuit and alternately energized and deenergized thereby, and control means in said circuit including a control voltage and an auxiliary voltage for varying the duration of operation of the device in one direction relative to the duration of operation in the other direction and thereby producing a differential movement of the device in one direction.

2. Electrical control apparatus comprising a reversible controlling device, electrical operating means for alternately and continuously operating the device in opposite directions over a given period including an electromagnet, means for operating the device in one direction when the magnet is energized and in the opposite direction when the magnet is deenergized, means for alternately energizing and deenergizing the magnet, and control means for varying the duration of energization of the magnet relative to the duration of deenergization and thereby producing a differential movement of the device in one direction.

3. Electrical control apparatus as set forth in claim 2, in which the means for operating the controlling device includes a movable armature associated with the electro-magnet and operating circuits selectively energized by movement of the armature.

4. Electrical control apparatus comprising a reversible motor, electrical means for alternately and continuously rotating the motor in opposite directions over a given period including motor reversing circuits, switch means for energizing said circuits, two electro-magnets for actuating said switch means, means for alternately energizing the electro-magnets comprising two quickly responsive vacuum tubes and output circuits for said tubes each connected to an electro-magnet, means for alternately actuating the tubes to generate output current and means for varying the relative duration of the contiguous periods of actuation of said tubes and thereby varying the duration of motor rotation in one direction relative to its rotation in the opposite direction, producing a differential net rotation in one direction.

5. An automatic voltage regulator comprising a variable potential transformer and a rectifier in series, and means for maintaining uniform rectifier output potential including a drive member, means driven by said member for varying the transformer output potential, and a control system including means for continuously applying successive reversing impulses to the drive member, and means responsive to variations in the rectifier output potential for varying the periods of operation of the drive member in one direction relative to the periods of operation in the opposite direction, thereby producing a net differential rotation in one direction and adjusting the transformer output potential to correct the transformer output potential variation.

6. A voltage regulator as set forth in claim 5, in which the means for reversing the drive member includes reversing switch means and alternately energized switch operating devices.

7. A voltage regulator as set forth in claim 5, in which the means for reversing the drive member includes reversing switch means, two electro-magnets associated with and actuating the switch means and means for alternately energizing the magnets comprising two vacuum tubes, output circuits for said tubes each including an electro-magnet, means for alternately operating the tubes to generate current in their output circuits and means responsive to variations in the rectifier output potential for varying the relative periods of operation of the tubes.

8. Electrical control apparatus comprising a reversible control device, electrical means for alternately and continuously operating said device in opposite directions including a pair of electro-magnets, each having a cooperating movable armature, each of said armatures operating said device in one direction when its cooperating electro-magnet is energized and in the opposite direction when the other electro-magnet is energized, a pair of vacuum tubes, output circuits for said tubes, each of said circuits passing through a different one of said electro-magnets, a source of control voltage, a source of compensating voltage, means for applying voltages from said sources to said tubes for alternately operating said tubes to energize said output circuits, means for varying the relative duration of the operating periods of said tubes, control device operating circuits, and means for selectively energizing said circuits when said armatures are shifted by said electro-magnets.

EDWARD M. SORENSEN.

REFERENCES CITED

The following references are of record in the file of this patent:

UNITED STATES PATENTS

| Number | Name | Date |
|---|---|---|
| 1,614,147 | Muller | Jan. 11, 1927 |
| 1,722,152 | Meiners | July 23, 1929 |
| 1,849,518 | Gay | Mar. 15, 1932 |
| 2,082,607 | Amsden | June 1, 1937 |
| 2,093,197 | Kern | Sept. 14, 1937 |
| 2,154,354 | Ranson | Apr. 11, 1939 |
| 2,175,009 | Anderson | Oct. 3, 1939 |
| 2,222,947 | Harrison | Nov. 26, 1940 |
| 2,228,843 | Palmer | Jan. 14, 1941 |
| 2,229,449 | Garman | Jan. 21, 1941 |
| 2,273,191 | Harrison | Feb. 17, 1942 |
| 2,337,589 | Chance | Dec. 28, 1943 |